United States Patent
Kuo

[11] Patent Number: 5,979,928
[45] Date of Patent: Nov. 9, 1999

[54] COLLAPSING DEVICE FOR A STROLLER

[75] Inventor: Chien-Tsai Kuo, No. 132-111, Sung Chiao, Sung Chiao Tsun, Kuan Miao Hsiang, Tainan Hsien, Taiwan

[73] Assignees: Taiwan Kidly Children Appliance Ltd., Tainan; Chien-Tsai Kuo, Tainan Hsien, both of Taiwan

[21] Appl. No.: 08/832,006

[22] Filed: Apr. 2, 1997

[51] Int. Cl.⁶ ................................................ B62B 1/00
[52] U.S. Cl. ...................................... 280/642; 280/648
[58] Field of Search .......................... 280/642, 655, 280/655.1, 648, 650, 47.36; 297/184.13, 184.15, 184.17, 354.12, 19, 20, 22; 135/67, 74

[56] References Cited

U.S. PATENT DOCUMENTS

| | | | |
|---|---|---|---|
| 4,619,542 | 10/1986 | Kassai | 280/642 |
| 4,779,879 | 10/1988 | Kassai | 280/47.36 |
| 5,087,066 | 2/1992 | Mong-Hsing | 280/650 |
| 5,447,323 | 9/1995 | Huang | 280/650 |
| 5,511,441 | 4/1996 | Arai | 280/642 |
| 5,524,503 | 6/1996 | Ishikura | 280/642 |
| 5,605,409 | 2/1997 | Haut et al. | 280/642 |
| 5,645,293 | 7/1997 | Cheng | 280/650 |
| 5,845,924 | 12/1998 | Huang | 280/47.36 |

FOREIGN PATENT DOCUMENTS 474  4/1991  Japan ........................... 280/642

*Primary Examiner*—Kevin Hurley
*Assistant Examiner*—Michael Britton
*Attorney, Agent, or Firm*—Rosenberg, Klein & Bilker

[57] ABSTRACT

A collapsing device for a stroller is provided, including a framework consisting of two front feet, two rear feet, a lying frame, an extended frame and an inverted U-shaped handle pivotally combined with the front and rear feet. When a pusher unit fixed on the handle is pressed, the extended frame supporting a canopy is swung down to a collapsed position to lie on the lying frame. Then, the handle is swung down, with two connecters functioning as pivots for the handle to permit the handle to disengage from the front feet in moving to the collapsed position, responsive to a contact member of each connecter respectively separating from upper ends of the two front feet.

2 Claims, 6 Drawing Sheets

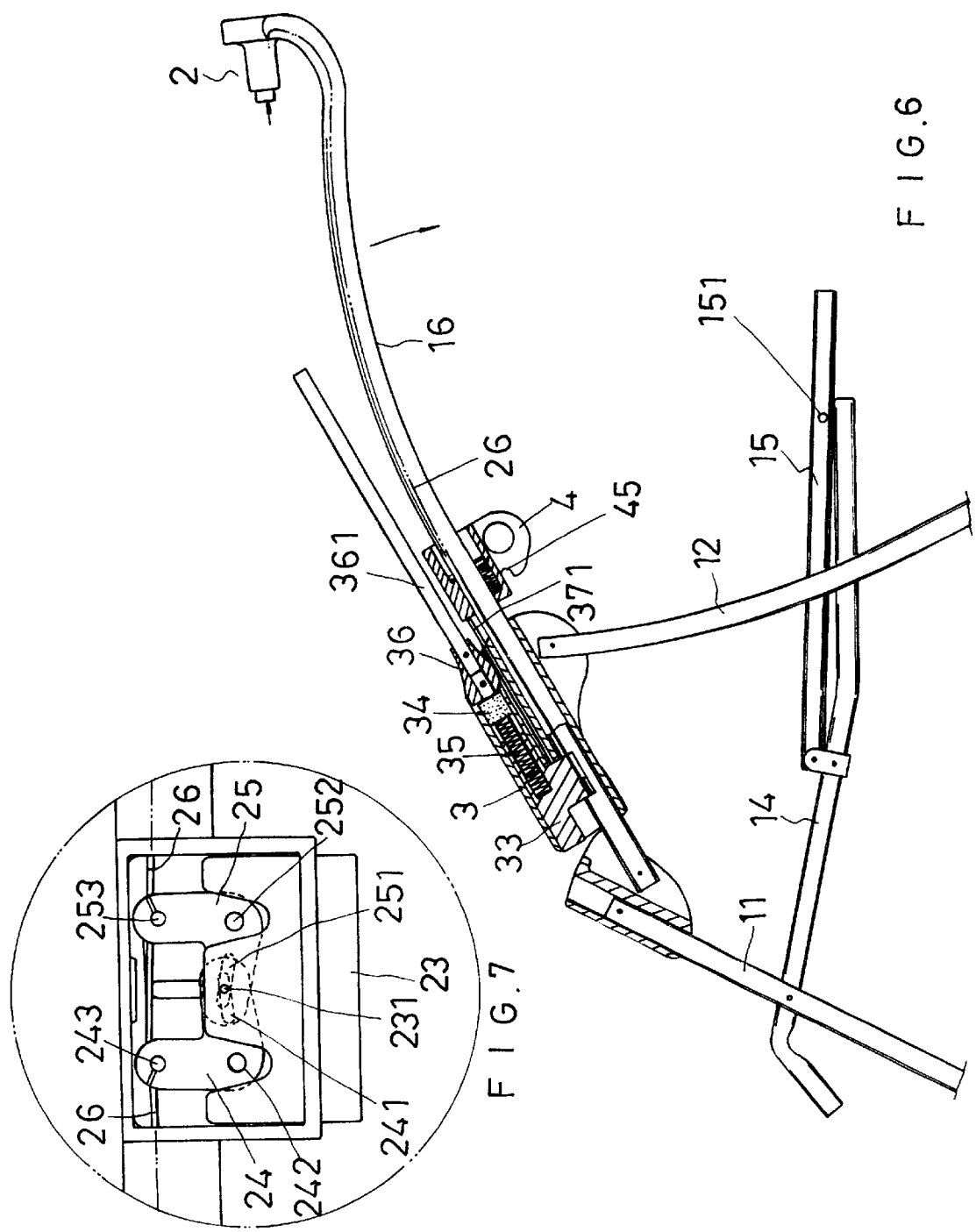

COLLAPSING DEVICE FOR A STROLLER

BACKGROUND OF THE INVENTION

This invention relates to a collapsing device for a stroller, particularly to a device having a push unit which can move a frame supporting a canopy, for shading sunlight, from an extended position to a collapsed position, wherein the canopy supporting extended frame lies on a lying frame. An inverted U-shaped handle is pivotally connected to the two front feet of the stroller, in the extended position, and is disengaged from the front feet in the collapsed position, by means of two connecters fixed on the handle and connecting the handle with the two front feet. The handle is tilted down and is supported by the two rear feet of the stroller, which have their upper ends pivotally combined with the handle.

Nowadays, collapsible strollers are widely used, having many kinds of collapsing devices for collapsing strollers with some advantages and some drawbacks.

SUMMARY OF THE INVENTION

This invention has been devised to provide a collapsing device for a stroller that is convenient to operate to collapse and extend.

One feature of the invention is a push unit fixed on an intermediate portion of an inverted U-shaped handle for easily collapsing a stroller by pressing it down. Then, an extended frame positioned almost upright, to support a canopy in an extended position, can be disengaged from elastic lockers respectively fixed on an intermediate portion of two sides of the handle, so that the extended frame can be lowered down to lie on a lying frame in a collapsed position.

Another feature of the invention is the inclusion of two connecters respectively fixed on two side portions of the handle, for disengaging the two ends of the two sides of the handle from the two front feet of the stroller, when the push unit is pressed to collapse the stroller.

One more feature of the invention is the inclusion of two elastic lockers respectively fixed around an intermediate portion of the two side portions of the handle, locking the extended frame in the extended position, with two sideways projecting bars of the extended frame respectively engaging two notches of the two elastic lockers.

BRIEF DESCRIPTION OF DRAWINGS

This invention will be better understood by referring to the accompanying drawings, wherein:

FIG. 6 is a side view of the present invention, showing it being folded rearwardly;

FIG. 7 is an enlarged upper view of the push unit of the present invention, showing it being pressed;

DESCRIPTION OF THE PREFERRED EMBODIMENT

Figure 1:
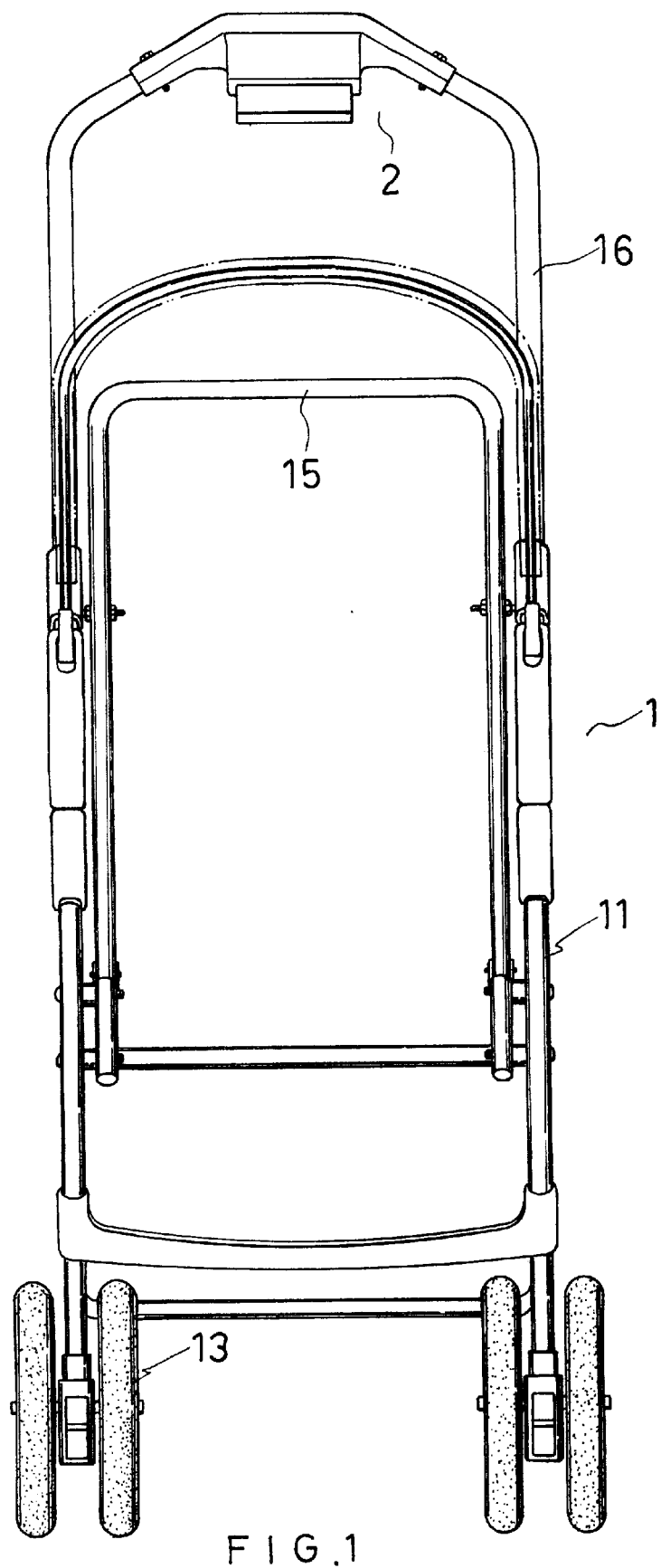
FIG. 1 is a front view of the present invention.
Figure 4:
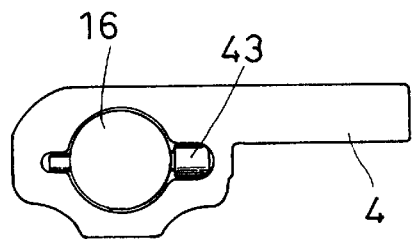
FIG. 4 is an upper view of the connecter of FIG. 3.
Figure 5:
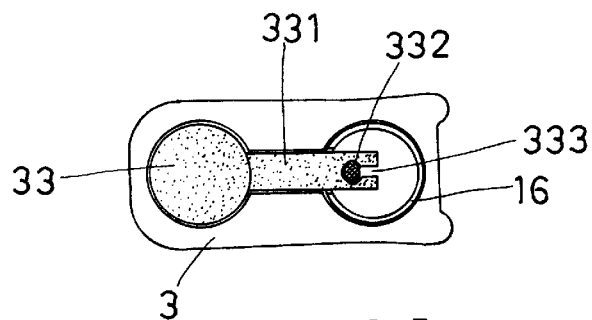
FIG. 5 is a bottom view of the connecter of FIG. 3.

A preferred embodiment of a collapsing device for a stroller, as shown in FIGS. 1 and 6, includes a main framework 1, wheels 13, a push unit 2, two connecters 3, 3, two elastic lockers 4, 4, two securing bases 36, 36 and an inverted U-shaped canopy frame 361 as main components that are combined together.

The main frame 1 consists of a pair of front feet 11, 11, a pair of rear feet 12, 12, a lying frame 14, and an inverted U-shaped extended frame 15, and an inverted U-shaped handle 16.

The pair of front feet 11, 11 and the pair of rear feet 12, 12, respectively have a lower end combined with a respective wheel 13. An intermediate portion of each of the front feet 11, 11 are pivotally combined with the lying frame 14. The lying frame supports a baby lying thereon. The lying frame 14 being displaceable with respect to the rear feet 12, 12.

Two lower ends of the inverted U-shaped extended frame 15 are pivotally combined with the lying frame 14 so that the extended frame 15 may be swung upward from a collapsed position of lying on the lying frame 14 to an extended position for supporting a canopy 5.

The inverted U-shaped handle 16 has two lower ends combined releasably with the upper ends of the pair of front feet 11, 11, by means of the two connecters 3, 3. The inverted U-shaped handle 16 is also pivotally connected with the pair of the rear feet 12, 12 by means of pivot pins.

Figure 2:
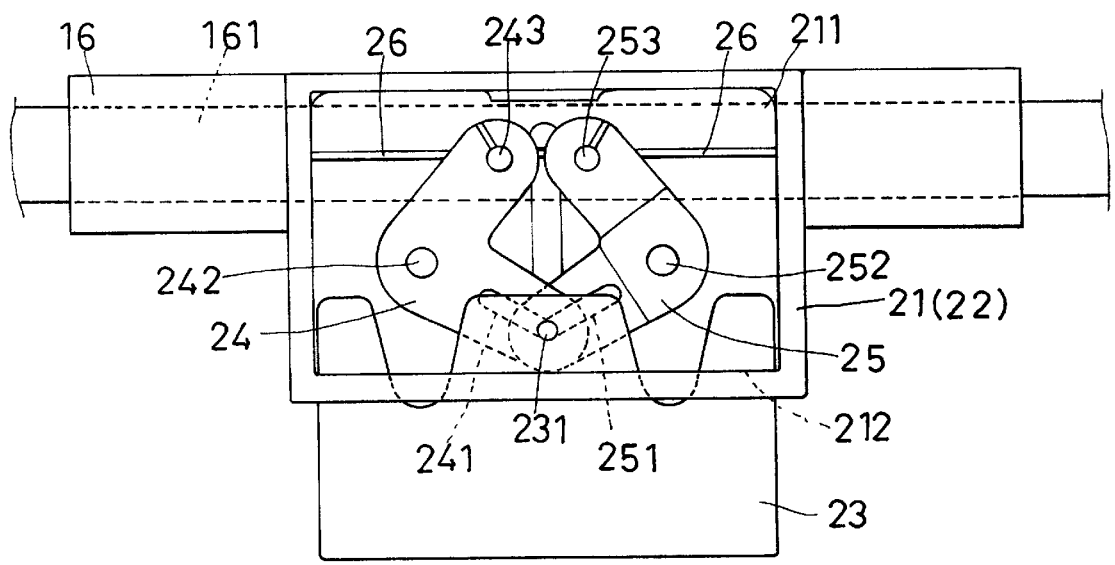
FIG. 2 is an upper view of a push unit combined with an intermediate portion of a handle of the present invention.

The push unit 2 is combined on an intermediate horizontal portion of the handle unit 16, as shown in FIG. 2, having a front cover 21 and a rear cover 22 respectively fixed on a front side and a rear side of the handle 16 with screws 27. The front cover 21 has an inner cavity 211, a hole 212 bored in a bottom side thereof. A pusher 23 is inserted through the bottom hole 212 into the cavity 211. The pusher 23 has an upper portion fixed with a pin 231 to two L-shaped arms 24, 25. The pin 231 passes through and is able to move in two slots 241, 251 of the two L-shaped arms 24, 25. The L-shaped arms 24, 25 are combined with the front cover 21 and the rear cover 22 in the inner cavity 211 with pins 242, 252, respectively fitted in an intermediate portion of the L-shaped arms 24, 25. Two pins 243, 253 are respectively pivotally connected with upper ends of the arms 24, 25. Upper ends of two ropes 26, 26 are respectively bound to the pins 243, 253. Each rope 26 extends through a respective lengthwise hole 161 of the two side portions of the handle 1.

Each connecter 3 is respectively fixed on a lower end portion of the two side portions of the inverted U-shaped handle 16. Each connecter 3 has a first passageway 31 formed in a front portion thereof for a guide portion 331 of a contact member 33 to fit therein. A second passageway 32 is formed in a rear portion of each of two lower ends of the handle 16. Each contact member 33 has an inlet 333 and a groove 332 behind the inlet 333 for each rope 26 and a limiter 28, each limiter 28 being fixed to a lower end of a respective rope 26 to fit therein. A respective stopper 29 is used to close each of two lower ends of the handle 16.

Figure 3:
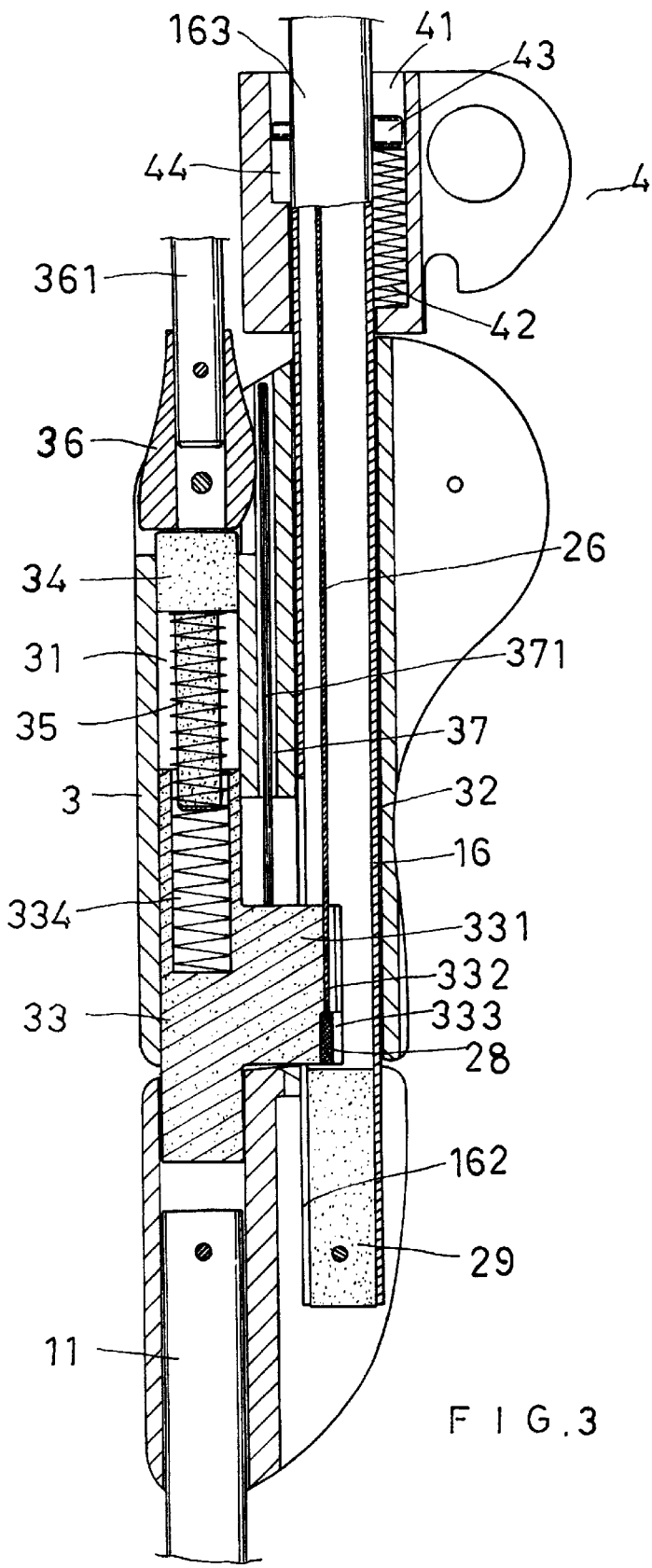
FIG. 3 is a cross-sectional view of a connecter respectively combined with a lower portion of two sides of the handle of the present invention.

As shown in FIG. 3, the contact member 33, fitted into the first passageway 31, has a vertical hole 334 formed in an upper portion. A spring 35 of a limit projection 34 is fitted into the vertical hole 334. Further, a securing base 36 of an inverted U-shaped canopy frame 361, for supporting a canopy 5, is pivotally connected at a proper location to each connecter 3. Each connecter 3 further has a lengthwise hole 37 for receiving a push bar 371 therein. The push bar 371 can be pushed up by the guide portion 331 of the contact member 33.

Figure 8:
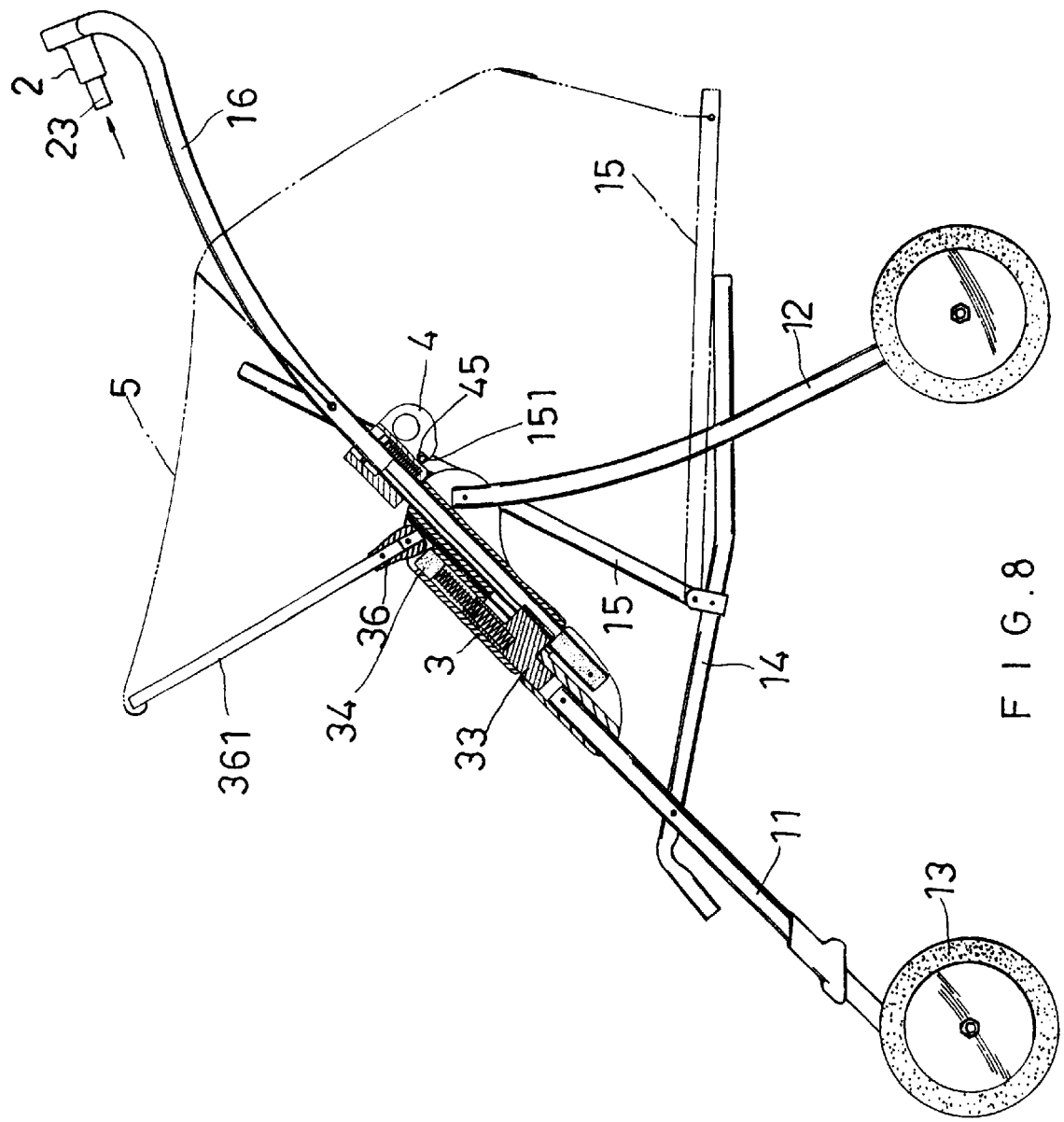
FIG. 8 is a side view of the an extended frame of the present invention, showing it being swung up from a collapsed position to an extended position and for supporting a canopy.

Each securing base 36 is combined with a respective lower end of the inverted U-shaped frame 361, for supporting the canopy 5 when the canopy 5 is extended, as shown in FIG. 8.

Each elastic locker 4 is fixed around an intermediate portion of a respective one of the two sides of the handle 16, near an upper end of each connecter 3. Each elastic locker 4 has a front inner cavity 44, and a rear inner cavity 41 in which a spring 42 is received. A pin 43 passing through the lengthwise hole 163 f the handle 16 has two protruding ends respectively movable within the cavities 41, 44 of each elastic locker 4. Further, each elastic locker 4 has a notch 45 formed in an appropriate location in a lower edge for a sideways projecting bar 151 of the extended frame 15 to fit therein to lock the extended frame 15 in an extended position of the stroller.

Figure 9:
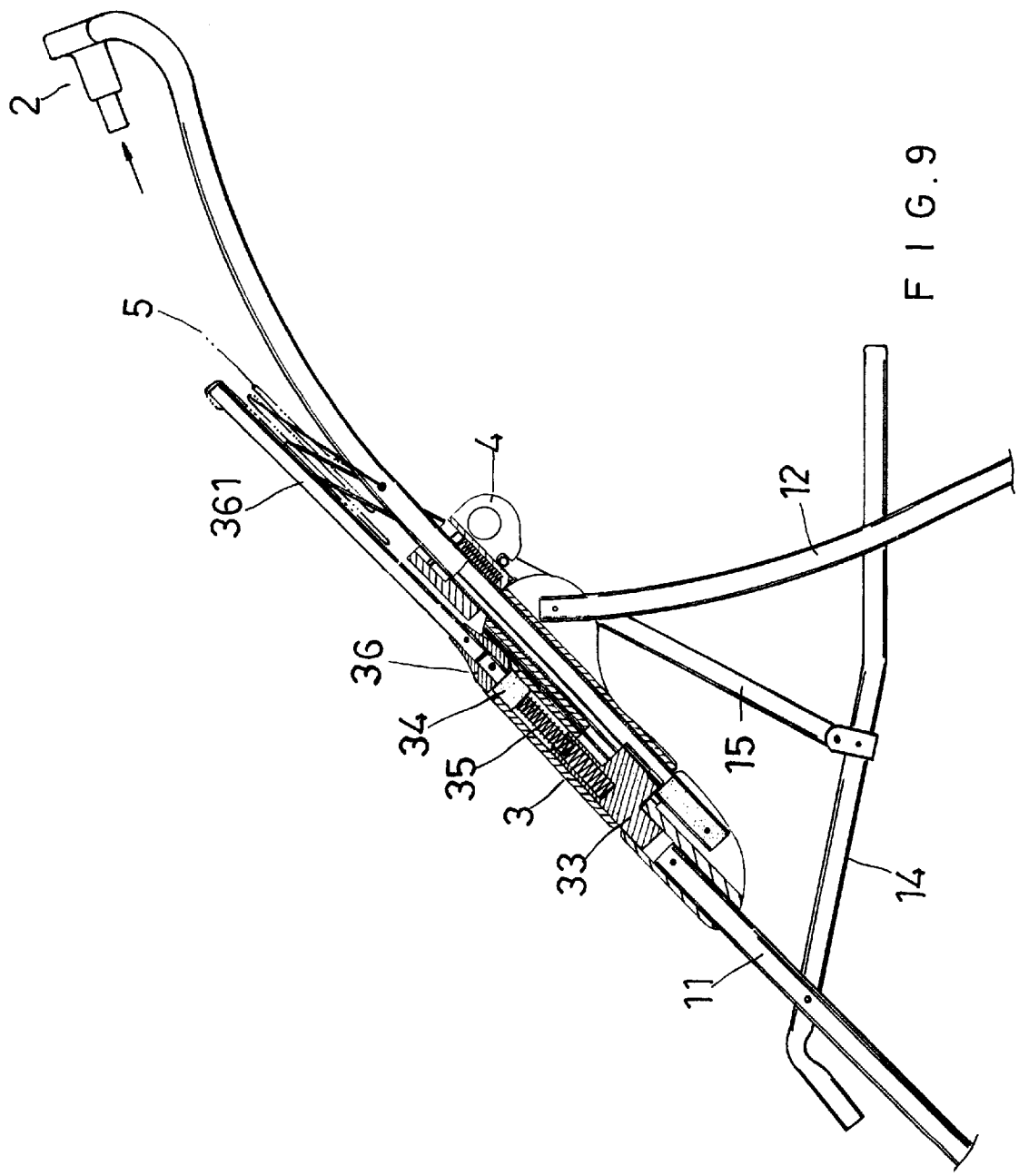
FIG. 9 is a side view of a canopy frame of the present invention, showing it swung down to lie on the handle.

If the stroller is to be collapsed from an extended position shown in FIG. 8 into a collapsed position shown in FIG. 9, referring to FIGS. 6 and 7, a user manually swings the two securing bases 36, 36 toward the handle 16, with the inverted U-shaped canopy frame 361 lying on the handle 16 and aligned with the front frame 11, with the canopy 5 collapsed. Next, the user presses down the pusher 23 of the push unit 2, forcing the two L-shaped arms 24 and 25 to pivot and thereby pull up the two ropes 26, 26. The two ropes 26, 26 then pull up the contact members 33, 33. Then the contact members 33, 33 respectively separate from the upper ends of the pair of the front feet 11, 11. At the same time, the push bars 371, 371 are pushed up by the contact members 33, 33, the push bars 371, 371 respectively pushing up the elastic lockers 4, 4 so that the notches 45, 45 are separated from a respective sideways projecting bar 151 of the extended frame 15. The extended frame 15 is then lowered down to lie on the lying frame 14. Lastly, the U-shaped handle 16 is pushed rearward to a collapsed position.

To extend the stroller from the collapsed position, shown in FIGS. 6, 7, into the extended position shown in FIG. 8, a user swings the handle 16 upward and forward, letting the contact members 33, 33 fit into the upper ends of the front frame 11 respectively, by elasticity of the springs 35, 35. If the canopy 5 is also to be used, as shown in FIG. 8, the inverted U-shaped frame 361 is swung forward to permit the canopy 5 to be extended and supported. Lastly, the extended frame 15 is swung up, letting the sideways protruding bars 151, 151 respectively engage the notches 45, 45, so as to secure the extended frame 15 in place for supporting the canopy 5, thereby finishing the extension process of the stroller.

While the preferred embodiment of the invention has been described above, it will be recognized and understood that various modifications may be made therein and the appended claims are intended to cover all such modifications which may fall in the spirit and scope of the invention.

What is claimed is:

1. A collapsing device for a stroller, comprising:
a framework including a pair of front feet, a pair of rear feet, a lying frame, an inverted U-shaped extended frame for supporting a canopy, and an inverted U-shaped handle;
each of said pair of front feet having a respective one of a plurality of wheels pivotally coupled to a lower end thereof, each of said pair of front feet having an intermediate portion pivotally coupled to said lying frame;
each of said pair of rear feet having a respective one of said plurality of wheels pivotally coupled to a lower end thereof and being displaceable with respect to said lying frame;
said lying frame being horizontally positionable for supporting a baby thereon;
said U-shaped extended frame having a pair of lower ends pivotally coupled to respect intermediate portions of said lying frame, said U-shaped extended frame having a sideways projecting bar from each of two sides thereof;
said inverted U-shaped handle having a lower end at each of two sides thereof pivotally connected to an upper end of each of said front feet, each side of said handle having an intermediate portion pivotally connected to an upper end of a respect one of said rear feet;
a pair of ropes respectively extending through a passage formed in each of said two sides of said handle;
a push unit coupled to an intermediate horizontal portion of said U-shaped handle, said push unit including a pair of L-shaped arms respectively connected to proximal ends of said pair of ropes for pulling said ropes;
a pair of connecters respectively fixed to said lower ends of said handle, each of said connecters having (a) a first passageway, (b) a contact member coupled to a distal end of a respective one of said ropes for upward displacement thereof responsive to said pulling of said ropes and having a portion thereof disposed in said first passageway, (c) a spring disposed in said first passageway for providing a bias force against said upward displacement, (d) a securing base abutting an upper end of said contact member and coupled to a respective one of two lower ends of a canopy frame, (e) an elongated hole, and (f) a push bar extending through said elongated hole and having a lower end contacting said contact member for displacement therewith, each of said connecters including a second passageway for receiving therein a respective one of said lower ends of said handle, each said contact member having a guide portion partially extending into said passage of each said two sides of said handle, said guide portion of each said contact member having a shallow recess formed in a vertical side thereof for receiving a limiter connected to said distal end of each said rope, each said contact member having a vertical hole opening to an upper end thereof for receiving said spring partially therein, said lower end of each said push bar being in contact with said guide portion of said contact members;
a pair of elastic lockers respectively movably mounted to said sides of said handle for releasably engaging said sideways projecting bars, said sideways projecting bars being released from engagement with said pair of elastic lockers responsive to an upward displacement thereof resulting from an upward displacement of said push bars.

2. A collapsing device for a stroller, comprising:
a framework including a pair of front feet, a pair of rear feet, a lying frame, an inverted U-shaped extended frame for supporting a canopy, and an inverted U-shaped handle;
each of said pair of front feet having a respective one of a plurality of wheels pivotally coupled to a lower end thereof, each of said pair of front feet having an intermediate portion pivotally coupled to said lying frame;
each of said pair of rear feet having a respective one of said plurality of wheels pivotally coupled to a lower end thereof and being displaceable with respect to said lying frame;

said lying frame being horizontally positionable for supporting a baby thereon;

said U-shaped extended frame having a pair of lower ends pivotally coupled to respective intermediate portions of said lying frame, said U-shaped extended frame having a sideways projecting bar from each of two sides thereof;

said inverted U-shaped handle having a lower end at each of two sides thereof pivotally connected to an upper end of each of said front feet, each side of said handle having an intermediate portion pivotally connected to an upper end of a respect one of said rear feet;

a pair of ropes respectively extending through a passage formed in each of said two sides of said handle;

a push unit coupled to an intermediate horizontal portion of said U-shaped handle, said push unit including a pair of L-shaped arms respectively connected to proximal ends of said pair of ropes for pulling said ropes;

a pair of connecters respectively fixed to said lower ends of said handle, each of said connecters having (a) a first passageway, (b) a contact member coupled to a distal end of a respective one of said ropes for upward displacement thereof responsive to said pulling of said ropes and having a portion thereof disposed in said first passageway, (c) a spring disposed in said first passageway for providing a bias force against said upward displacement, (d) a securing base abutting an upper end of said contact member and coupled to a respective one of two lower ends of a canopy frame, (e) an elongated hole, and (f) a push bar extending through said elongated hole and having a lower end contacting said contact member for displacement therewith;

a pair of elastic lockers respectively movably mounted to said sides of said handle for releasably engaging said sideways projecting bars, said sideways projecting bars being released from engagement with said pair of elastic lockers responsive to an upward displacement thereof resulting from an upward displacement of said push bars, each said elastic locker having a first cavity formed in a front portion thereof and a second cavity formed in a rear portion thereof for receiving a respective pin passing sideways through said lower ends of said handle, each said pin having two ends protruding in said first cavity and said second cavity and able to move up and down therein.

* * * * *